US008416481B2

(12) United States Patent
Chikaoka et al.

(10) Patent No.: US 8,416,481 B2
(45) Date of Patent: Apr. 9, 2013

(54) LASER PROJECTOR (75) Inventors: Atsuhiko Chikaoka, Osaka (JP);
Atsuya Hirano, Osaka (JP); Ken Nishioka, Osaka (JP); Hiroshi Nishigaki, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 382 days.

(21) Appl. No.: 12/724,879

(22) Filed: Mar. 16, 2010

(65) Prior Publication Data
US 2010/0231870 A1 Sep. 16, 2010

(30) Foreign Application Priority Data

Mar. 16, 2009 (JP) .............................. P. 2009-062612

(51) Int. Cl.
*G02B 26/08* (2006.01)

(52) U.S. Cl.
USPC .................. 359/199.1; 359/198.1; 359/213.1

(58) Field of Classification Search .... 359/198.1–203.1, 359/213.1–215.1, 226.1; 353/34, 37, 50–51; 345/30, 32; 348/98–101, 103, 108, 205, 348/744, 750, 755–756, 759, 769–770
See application file for complete search history.

(56) References Cited

U.S. PATENT DOCUMENTS 6,087,645 A * 7/2000 Kitajima et al. .......... 250/203.1
7,130,095 B1 10/2006 Wood
7,978,387 B2 * 7/2011 Chikaoka et al. .......... 359/199.1
2008/0239252 A1 10/2008 Konno et al.
2008/0285103 A1 11/2008 Mizumoto
2011/0141441 A1 6/2011 Konno et al.

FOREIGN PATENT DOCUMENTS

| EP | 2315067 A1 | 4/2011 |
| JP | 2002-328428 | 11/2002 |
| JP | 2008-1858943 A1 | 8/2008 |
| JP | 2008249797 A | 10/2008 |
| JP | 2008268645 A | 11/2008 |
| JP | 2008310295 A | 12/2008 |
| JP | 2008547054 A | 12/2008 |

* cited by examiner

*Primary Examiner* — James Phan
(74) *Attorney, Agent, or Firm* — Morgan, Lewis & Bockius LLP (57) ABSTRACT A laser projector is provided. A laser light source is configured to emit laser light. A scanning section is configured to scan a projection surface in a horizontal direction and a vertical direction with the laser light emitted from the laser light source, thereby forming an image on the projection surface. A generating section is configured to generate a pulse signal. A driving section is configured to reciprocate the scanning section in the horizontal direction in accordance with the pulse signal generated by the generating section. An adjusting section is configured to adjust a pulse pattern of the pulse signal generated by the generating section so as to change a scanning angle range of the scanning section in the horizontal direction.

8 Claims, 6 Drawing Sheets

FIG. 8B HORIZONTAL MIRROR DRIVING SIGNAL (SECTION a)

FIG. 8C HORIZONTAL MIRROR DRIVING SIGNAL (SECTION b)

LASER PROJECTOR

The disclosure of Japanese Patent Application No. 2009-062612 filed on Mar. 16, 2009 including specification, drawings and claims is incorporated herein by reference in its entirety.

BACKGROUND

The present invention relates to a laser projector that scans a projection surface with light emitted from a laser light source to display an image.

A laser projector using a laser as a light source scans a screen with laser light in two axial directions by reflecting the laser light emitted from the light source with a resonant mirror, thereby displaying an image on the screen.

The laser light emitted from the laser projector to the screen is incident on the screen while the incident angle thereof is changed by the mirror. Therefore, trapezoidal distortion in which the size of the image projected onto the screen increases as the distance from the projector is increased is likely to occur.

In order to correct the trapezoidal distortion, generally, a related-art projector performs image processing to correct the image to have a rectangular shape.

In addition, a projector disclosed in Japanese Patent Publication No. 2002-328428A measures the distance from the projector to the screen and adjusts the angle of the mirror reflecting the laser light to scan the screen on the basis of the measured distance, thereby correcting the image projected onto the screen and displaying the corrected image.

However, in the related-art projector, information may be omitted due to optical image processing and the quality of the displayed image may deteriorate.

In addition, in the projector disclosed in Japanese Patent Publication No. 2002-328428A, for example, when the incident angle of the laser light on the screen is small and the laser light reflected from the screen may not return to the projector. If a light receiving unit cannot detect the reflected light, it is difficult to measure the distance from the projector to the screen. When the distance from the projector to the screen is not measured, it is difficult to correct the image.

SUMMARY

It is therefore an object of at least one embodiment of the present invention to provide a laser projector capable of easily correcting a projection image.

In order to achieve the above described object, according to a first aspect of at least one embodiment of the present invention, there is provided a laser projector, comprising: a laser light source configured to emit laser light; a scanning section configured to scan a projection surface in a horizontal direction and a vertical direction with the laser light emitted from the laser light source, thereby forming an image on the projection surface; a generating section configured to generate a pulse signal; a driving section configured to reciprocate the scanning section in the horizontal direction in accordance with the pulse signal generated by the generating section; and an adjusting section configured to adjust a pulse pattern of the pulse signal generated by the generating section so as to change a scanning angle range of the scanning section in the horizontal direction.

A time period in which the scanning section scans the projection surface for forming one frame of the image may include: a projection section in which a scanning position of the scanning section is changed from a start point to an end point in the vertical direction while scanning the projection surface in the horizontal direction with the laser light, thereby forming the one frame of the image; and a non-projection section in which the scanning position of the scanning section is returned from the end point to the start point in the vertical direction. The adjusting section may control the generating section to generate the pulse signal having a projection pulse pattern for changing the scanning angle range of the scanning section from a first scanning angle range to a second scanning angle range in the projection section and a non-projection pulse pattern for changing the scanning angle range of the scanning section from the second scanning angle range to the first scanning angle range.

The generating section may increase or decrease the number of pulses in the pulse signal to change the scanning angle range of the scanning section in the horizontal direction.

The generating section may increase or decrease a pulse width of the pulse signal to change the scanning angle range of the scanning section in the horizontal direction.

The generating section may increase or decrease the pulse width of the pulse signal with respect to a center of each pulse in the pulse signal.

The generating section may increase or decrease a pulse amplitude of the pulse signal to change the scanning angle range of the scanning section in the horizontal direction.

The laser projector may further comprise a detecting section configured to detect an elevation angle or a depression angle of the laser projector with respect to the projection surface. The adjusting section may adjust the pulse pattern of the pulse signal generated by the generating section in accordance with the elevation angle or the depression angle detected by the detecting section. The adjusting section may control the generating section to generate the pulse signal such that the scanning angle range of the scanning section in the horizontal direction is reduced as an incident angle of the laser light on the projection surface is reduced.

According to a second aspect of at least one embodiment of the present invention, there is provided a laser projector, comprising: a laser light source configured to emit laser light; a scanning section configured to scan a projection surface in a horizontal direction and a vertical direction with the laser light emitted from the laser light source, thereby forming an image on the projection surface; a generating section configured to generate a pulse signal; a driving section configured to reciprocate the scanning section in the horizontal direction in accordance with the pulse signal generated by the generating section; a detecting section configured to detect an elevation angle or a depression angle of the laser projector with respect to the projection surface; and an adjusting section configured to adjust a pulse pattern of the pulse signal generated by the generating section in accordance with the elevation angle or the depression angle detected by the detecting section so as to change a scanning angle range of the scanning section in the horizontal direction, wherein a time period in which the scanning section scans the projection surface for forming one frame of the image includes: a projection section in which a scanning position of the scanning section is changed from a start point to an end point in the vertical direction while scanning the projection surface in the horizontal direction with the laser light, thereby forming the one frame of the image; and a non-projection section in which the scanning position of the scanning section is returned from the end point to the start point in the vertical direction, wherein the adjusting section controls the generating section to generate the pulse signal having a projection pulse pattern for changing the scanning angle range of the scanning section from a first scanning angle range to a second scanning angle range in the projection section and a non-projection pulse pattern for changing the scanning angle range of the scanning section from the second scanning angle range to the first scanning angle range, wherein the generating section increases or decreases at least one of the number of pulses in the pulse signal, a pulse width of the pulse signal, and a pulse amplitude of the pulse signal to change the scanning angle range of the scanning section in the horizontal direction, and wherein the adjusting section controls the generating section to generate the pulse signal such that the scanning angle range of the scanning section in the horizontal direction is reduced as an incident angle of the laser light on the projection surface is reduced.

According to the above-mentioned aspects of at least one embodiment of the present invention, the laser projector can change the pulse pattern of the pulse signal such that, the scanning angle range of the scanning section in the horizontal direction is reduced as the incident angle of the laser light on the projection surface is reduced. Therefore, it is possible to easily correct the projection image formed on the projection surface so as to have a rectangular shape.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 3A and 3B are diagrams illustrating the angle of the laser projector with respect to a screen when the laser projector projects an image onto the screen.

FIGS. 4A to 4C are diagrams illustrating a pulse signal with a resonance frequency f0.

FIGS. 5A to 5C are diagrams illustrating a pulse signal with a resonance frequency f0.

FIGS. 6A to 6C are diagrams illustrating a pulse signal with a resonance frequency f0;

FIGS. 7A to 7C are diagrams illustrating a pulse signal with a resonance frequency f0; FIGS. 8A to 8B are diagrams illustrating a projection section and a non-projection section of the laser projector.

DETAILED DESCRIPTION OF THE EMBODIMENTS

Hereinafter, exemplary embodiments of the invention will be described with reference to the accompanying drawings. The scope of the invention is not limited to examples shown in the drawings.

Figure 1:
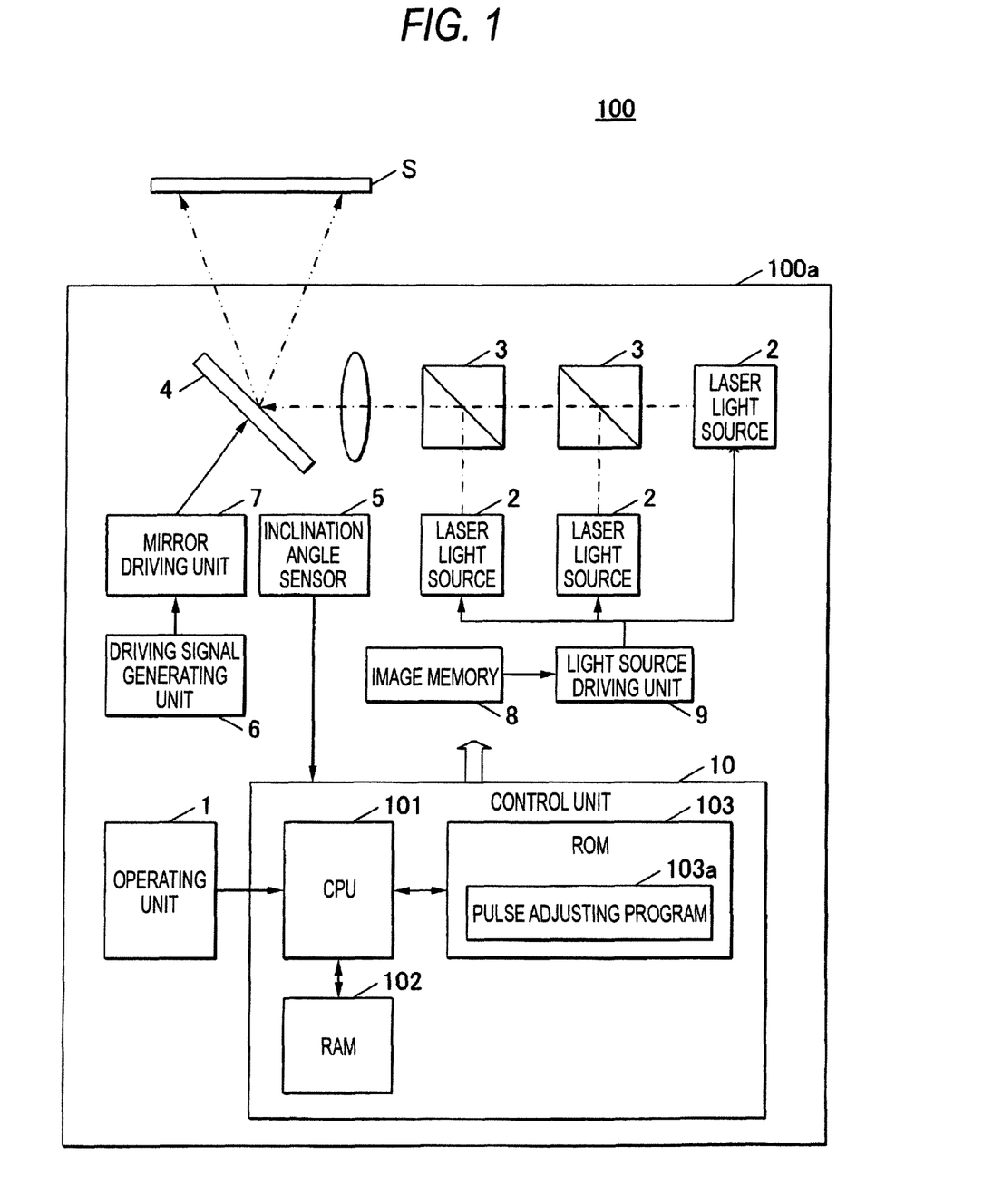
FIG. 1 is a block diagram illustrating a laser projector according to an embodiment of the present invention.

As shown in FIG. 1, a laser projector 100 includes, in a housing 100a, an operating unit 1, laser light sources 2 that emit laser light, mirror units 3 that compose the laser light emitted from the laser light sources 2, an electromagnetically-driven scanning mirror 4 that reflects the laser light emitted from the laser light sources 2 to scan a screen S, which is a projection surface, an inclination angle sensor 5 that detects the inclination angle of the laser projector 100 with respect to the screen S, a driving signal generating unit 6 that generates a driving signal with a predetermined frequency, a mirror driving unit 7 that drives the electromagnetically-driven scanning mirror 4 on the basis of the driving signal generated by the driving signal generating unit 6, an image memory 8 that stores image data of an image to be displayed on the screen S, a light source driving unit 9 that drives the laser light sources 2 on the basis of the image data, and a control unit 10.

The laser light sources 2 are, for example, semiconductor lasers (LD: Laser Diode) and are driven by the light source driving unit 9 on the basis of the image data stored in the image memory 8 to emit red (R), green (G), and blue (B) laser beams.

Each of the mirror units 3 is, for example, a dichroic mirror that transmits light with a specific wavelength and reflects light with the other wavelengths. The mirror units 3 compose color laser beams emitted from a plurality of laser light sources 2 into laser light with one optical axis, and emit the laser light to the electromagnetically-driven scanning mirror 4.

The electromagnetically-driven scanning mirror 4 serves as a scanning unit that is electromagnetically driven to reflect the laser light emitted from the laser light sources 2 in a two-dimensional direction such that the laser light is projected onto the screen S, thereby scanning the screen S. The electromagnetically-driven scanning mirror 4 is, for example, an electromagnetically-driven MEMS mirror using a MEMS (Micro Electro Mechanical System) technique. The MEMS mirror is a fine device manufactured by integrating a mechanical structure and an electric circuit on a silicon wafer using a micro machining technique. The use of the MEMS mirror makes it possible to reduce the overall size of an apparatus.

Figure 2:
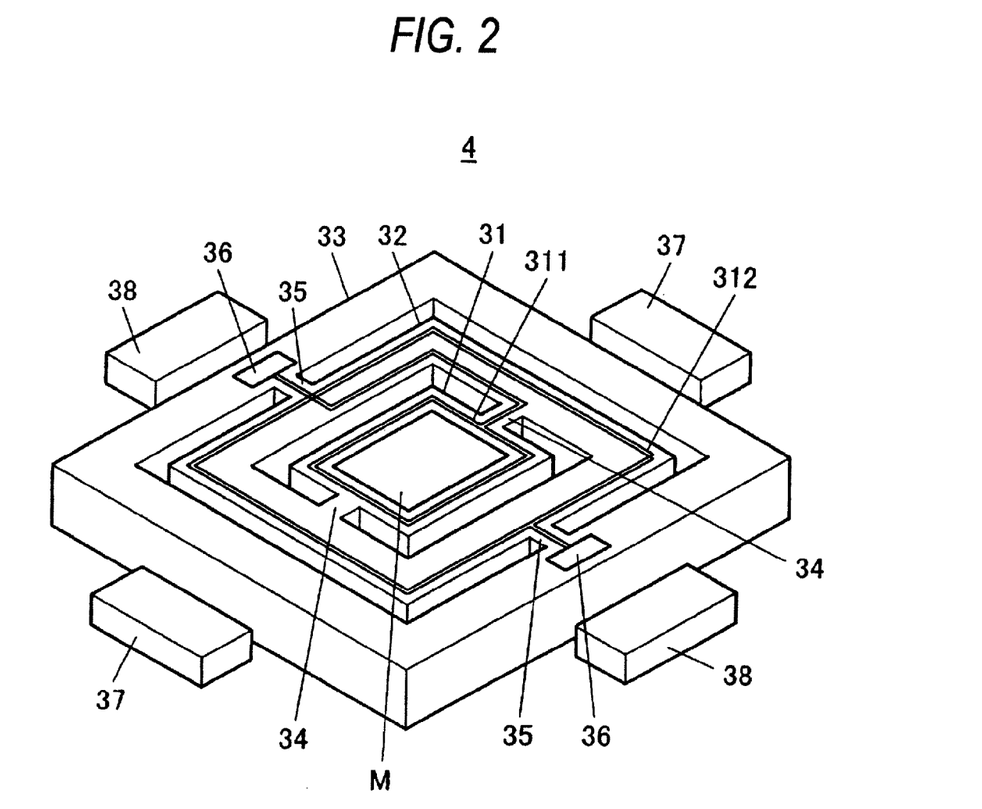
FIG. 2 is a perspective view illustrating an electromagnetically-driven scanning mirror according to the embodiment.

As shown in FIG. 2, the electromagnetically-driven scanning mirror 4, serving as a MEMS mirror, includes a mirror substrate 31 that reflects laser light, an inner frame 32 that is formed so as to surround the mirror substrate 31, and an outer frame 33 that is formed so as to surround the inner frame 32.

The mirror substrate 31 is supported by an inner axis 34 inside the inner frame 32 and is swingable about the inner axis 34. In addition, the inner frame 32 is supported by an outer axis 35 that is provided in a direction orthogonal to the inner axis 34 inside the outer frame 33 and is swingable about the outer axis 35.

A mirror M is provided substantially at the center of the surface of the mirror substrate 31, and a plane-shaped coil 311 is formed in a circumferential portion surrounding the mirror M. In addition, a plane-shaped coil 312 is formed in a circumferential portion of the surface of the inner frame 32, and the ends of the coils 311 and 312 are electrically connected to electrodes 36.

Two pairs of permanent magnets 37 and 38 are arranged on the side surfaces of the outer frame 33 such that the N-pole and the S-pole are opposite to each other. A pair of permanent magnets 37 is opposite to each other in the axial direction of the inner axis 34, and a pair of permanent magnets 38 is opposite to each other in the axial direction of the outer axis 35.

The driving signal generating unit 6 generates a driving signal with the natural resonance frequency of the electromagnetically-driven scanning mirror 4 under the control of the control unit 10.

In particular, the driving signal generating unit 6 serves as a scanning signal generating unit and generates a pulse signal for allowing the electromagnetically-driven scanning mirror 4 to reflect laser light in the horizontal direction, thereby scanning the screen. In addition, the driving signal generating unit 6 generates a driving signal for allowing the electromagnetically-driven scanning mirror 4 to reflect laser light in the vertical direction, thereby scanning the screen.

Main scanning with laser light in the horizontal direction by the electromagnetically-driven scanning mirror 4 is performed at a high speed, but sub-scanning with laser light in the vertical direction is performed at a low speed. After one reciprocating main scanning operation is performed in the horizontal direction, sub-scanning is performed on the next row in the vertical direction. However, after the main scanning is performed on the last row, the sub-scanning is performed upward at a relatively high speed in order to perform the main scanning on the first row.

The mirror driving unit 7 serves as a driving unit that is connected to the electrodes 36 of the electromagnetically-driven scanning mirror 4 and drives the electromagnetically-driven scanning mirror 4 on the basis of the driving signal generated by the driving signal generating unit 6.

In the electromagnetically-driven scanning mirror 4, when a driving voltage is applied to the electrodes 36 provided at both ends of the coils 311 and 312 and a current flows, the Lorentz force is generated by interaction with the magnetic field generated by the permanent magnets 37 and 38, and the mirror substrate 31 and the inner frame 32 are tilted about the inner axis 34 and the outer axis 35, respectively.

Therefore, it is possible to freely tilt the electromagnetically-driven scanning mirror 4 in two directions (the horizontal direction and the vertical direction) orthogonal to each other, that is, two directions aligned with the inner axis 34 and the outer axis 35, by controlling the current signal flowing through the electromagnetically-driven scanning mirror 4.

When a pulse signal, which is a driving signal that varies with a predetermined period, is applied to the electromagnetically-driven scanning mirror 4, the electromagnetically-driven scanning mirror 4 is oscillated with a predetermined period corresponding to the period (frequency) of the pulse signal. In particular, when the electromagnetically-driven scanning mirror 4 is driven at a resonance frequency f0, the electromagnetically-driven scanning mirror 4 is tilted at the maximum deflection angle of a current value. Therefore, it is possible to display a large image with the highest efficiency and low power consumption.

The inclination angle sensor 5 serves as an angle detecting unit that detects the angle of the laser projector 100 with respect to the screen S, that is, the elevation angle or the depression angle of the housing 100a of the laser projector 100 with respect to the screen S, and outputs data of the detected angle to the control unit 10.

The operating unit 1 is provided on the surface of the housing 100a, receives an input, such as data related to the angle of the laser projector 100 with respect to the screen S, that is, the elevation angle or the depression angle of the housing 100a with respect to the screen S, and outputs the data or an operation signal to the control unit 10.

The image memory 8 stores image data of the image to be displayed on the screen S. An image data supply source is not limited thereto, but image data stored in various kinds of storage devices of, for example, a PC (Personal Computer) and a video camera connected to the housing 100a may be used.

The light source driving unit 9 drives the laser light sources 2 on the basis of the image data read from the image memory 8 to adjust laser light in each pixel, thereby changing the color of the laser light composed by the mirror unit 3. The control unit 10 includes, for example, a CPU (Central Processing Unit) 101, a RAM (Random Access Memory) 102 that is used as a work area of the CPU 101, and a ROM (Read Only Memory) 103 that stores various kinds of data or programs.

The CPU 101 executes various kinds of programs stored in the ROM 103 according to an input signal input from each unit of the laser projector 100, and outputs an output signal to each unit on the basis of the executed programs, thereby controlling overall operation of the laser projector 100.

The ROM 103 has, for example, a pulse adjusting program 103a stored in a program storage area.

In addition, the ROM 103 stores data related to a pulse signal for adjusting the angle range of the electromagnetically-driven scanning mirror 4 in the horizontal direction such that a rectangular image is projected onto the screen S according to the incident angle of the laser light on the screen S.

The pulse adjusting program 103a allows the CPU 101 to adjust and change a pulse pattern of the pulse signal generated by the driving signal generating unit 6 according to, for example, the angle detected by the inclination angle sensor 5 or data input through the operating unit 1.

The CPU 101 executes the pulse adjusting program 103a to perform a function of changing the pulse pattern of the pulse signal, such as a function of modulating the pulse signal generated by the driving signal generating unit 6, such that the angle of the electromagnetically-driven scanning mirror 4 driven by the mirror driving unit 7 is reduced as the incident angle of the laser light on the screen S is reduced, on the basis of the elevation angle or the depression angle of the laser projector 100 (housing 100a) detected by the inclination angle sensor 5 or data input through the operating unit 1.

The CPU 101 executes the pulse adjusting program 103a to function as a pulse adjusting unit.

Specifically, the CPU 101, serving as a pulse adjusting unit, performs a process of increasing or decreasing the number of pulses in the pulse signal generated by the driving signal generating unit 6, serving as a scanning signal generating unit, such as a process of decimating the number of pulses of the pulse signal, thereby adjusting the angle range of the electromagnetically-driven scanning mirror 4 driven in the horizontal direction by the mirror driving unit 7.

In addition, the CPU 101, serving as a pulse adjusting unit, increases or decreases the pulse width of the pulse signal generated by the driving signal generating unit 6, serving as a scanning signal generating unit, to adjust the angle range of the electromagnetically-driven scanning mirror 4 driven in the horizontal direction by the mirror driving unit 7.

The CPU 101, serving as a pulse adjusting unit, increases or decreases the pulse amplitude of the pulse signal generated by the driving signal generating unit 6, serving as a scanning signal generating unit, to adjust the angle range of the electromagnetically-driven scanning mirror 4 driven in the horizontal direction by the mirror driving unit 7.

Next, the process of the laser projector 100 projecting an image onto the screen S will be described.

It is assumed that the angle of the electromagnetically-driven scanning mirror 4 of the laser projector 100 is '+θ' when the uppermost row is scanned and the angle of the electromagnetically-driven scanning mirror 4 is '−θ' when the lowermost row is scanned.

Figure 3A:
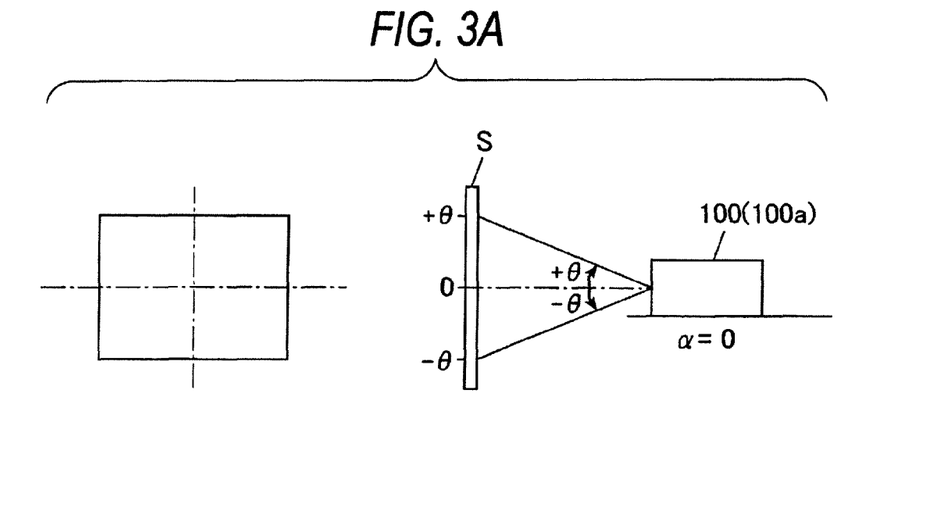
FIG. 3A illustrates a case where the angle of a housing of the laser projector with respect to the screen is 0° and FIG. 3B illustrates a case where the angle of the housing with respect to the screen is α°.

When the angle (the elevation angle or the depression angle) a of the laser projector 100 (housing 100*a*) with respect to the screen S is zero, as shown in FIG. 3A, the incident angle of laser light radiated to the upper or lower side on the screen S is less than the incident angle of the laser light radiated from the front surface of the laser projector 100 and vertically incident on the screen S.

When the inclination angle sensor 5 detects the angle (the elevation angle or the depression angle) α of the laser projector 100 (housing 100*a*) with respect to the screen S is zero, the CPU 101, serving as a pulse adjusting unit, controls the driving signal generating unit 6 to generate a pulse signal such that the angle range of the electromagnetically-driven scanning mirror 4 driven in the horizontal direction is the maximum when the laser projector 100 emits the laser light in the horizontal direction to the center (position '0' in FIG. 3A) of the screen S in the vertical direction. In addition, the CPU 101 controls the driving signal generating unit 6 to generate a pulse signal such that the angle range of the electromagnetically-driven scanning mirror 4 driven in the horizontal is gradually reduced toward the uppermost row (position '+θ' in FIG. 3A) or the lowermost row (position '−θ' in FIG. 3A),.

Figure 3B:
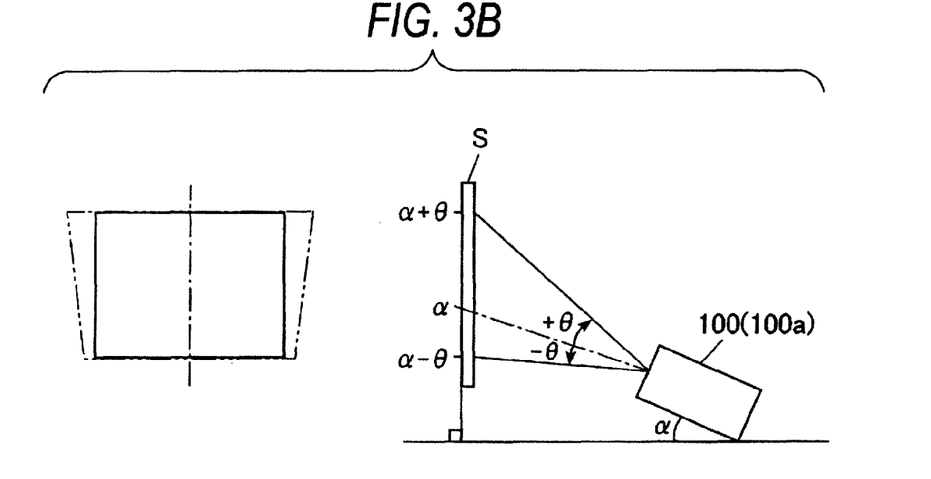

As shown in FIG. 3B, when the angle (the elevation angle or the depression angle) of the laser projector 100 (housing 100*a*) with respect to the screen S is α°, the laser light is emitted to the uppermost row according to the angle of the electromagnetically-driven scanning mirror 4 in the vertical direction, and the incident angle of the laser light on the screen S is 'a+θ'. In addition, the laser light is emitted to the lowermost row, and the incident angle of the laser light on the screen S is 'α−θ'.

When the inclination angle sensor 5 detects the angle (the elevation angle or the depression angle) of the laser projector 100 (housing 100*a*) with respect to the screen S is α°, the CPU 101, serving as a pulse adjusting unit, controls the driving signal generating unit 6 to generate a pulse signal such that the angle range of the electromagnetically-driven scanning mirror 4 driven in the horizontal direction is reduced as the incident angle of laser light on the screen S is reduced, according to the incident angle of laser light on the screen S, while the scanning with the laser light is moved from the uppermost row (position 'α+θ' in FIG. 3B) to the lowermost row (position 'α−θ' in FIG. 3B).

Figure 4A:
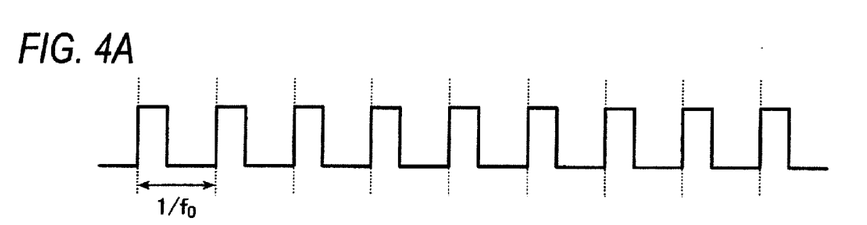
FIG. 4A illustrates a reference pulse signal.
Figure 4B:
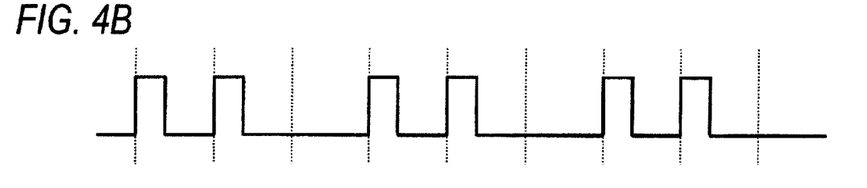
FIG. 4B illustrates a pulse signal with a smaller number of pulses than the reference pulse signal.
Figure 4C:
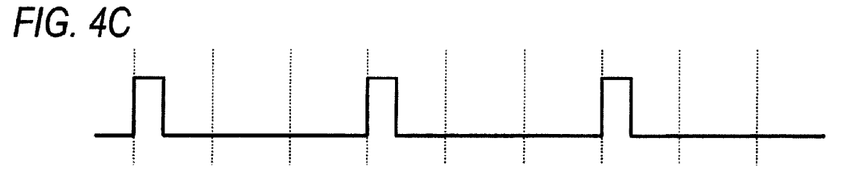
FIG. 4C illustrates a pulse signal with a smaller number of pulses than the pulse signal shown in FIG. 4B.

Specifically, the CPU 101, serving as a pulse adjusting unit, controls the driving signal generating unit 6 to generate an intermittent pulse signal (see FIGS. 4B and 4C) obtained by decimating pulses from a pulse signal shown in FIG. 4A with a resonance frequency f0 where the angle range of the electromagnetically-driven scanning mirror 4 driven in the horizontal direction is the maximum. Then, the CPU 101 drives the electromagnetically-driven scanning mirror 4 with an intermittent pulse signal from which pulses are further decimated as the scanning with the laser light is moved to the uppermost row or the lowermost row and the incident angle of the laser light on the screen S is reduced, according to the angle of the electromagnetically-driven scanning mirror 4 in the vertical direction, thereby reducing the angle range of the electromagnetically-driven scanning mirror 4 driven in the horizontal direction.

Figure 5A:
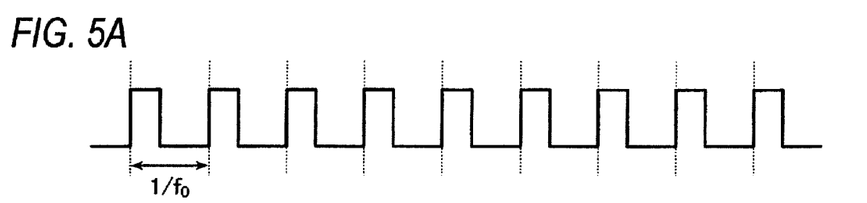
FIG. 5A illustrates a reference pulse signal.
Figure 5B:
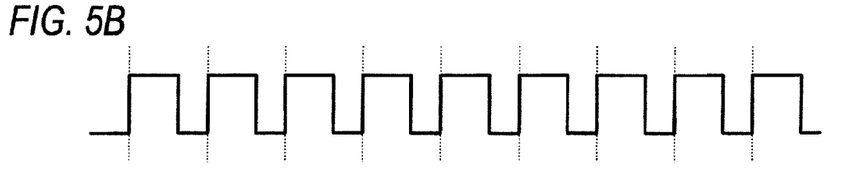
FIG. 5B illustrates a pulse signal with a pulse width greater than that of the reference pulse signal.
Figure 5C:
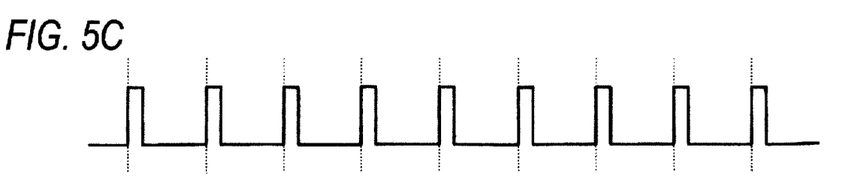
FIG. 5C illustrates a pulse signal with a pulse width less than that of the reference pulse signal.

In addition, the CPU 101, serving as a pulse adjusting unit, controls the driving signal generating unit 6 to generate a pulse signal (see FIG. 5B) with a pulse width that is greater than that of a pulse signal shown in FIG. 5A with the resonance frequency f0 or a pulse signal (see FIG. 5C) with a pulse width that is less than that of the pulse signal shown in FIG. 5A. Then, the CPU 101 drives the electromagnetically-driven scanning mirror 4 with a pulse signal whose pulse width is reduced as the scanning with the laser light is moved to the uppermost row or the lowermost row and the incident angle of the laser light on the screen S is reduced, according to the angle of the electromagnetically-driven scanning mirror 4 in the vertical direction, thereby reducing the angle range of the electromagnetically-driven scanning mirror 4 driven in the horizontal direction.

Figure 6A:
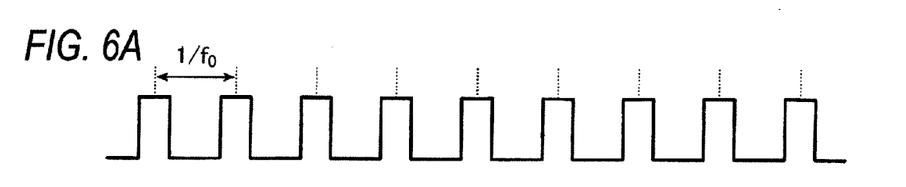
FIG. 6A illustrates a reference pulse signal.
Figure 6B:
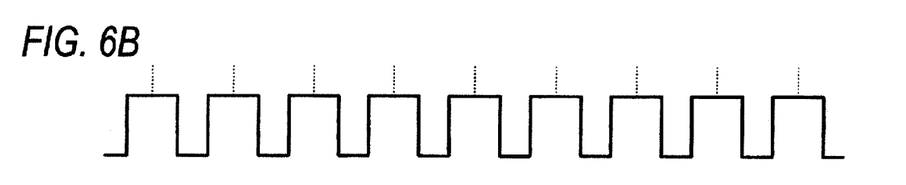
FIG. 6B illustrates a pulse signal with a pulse width that is increased from the reference pulse signal with the centers of the pulses being aligned with each other.
Figure 6C:
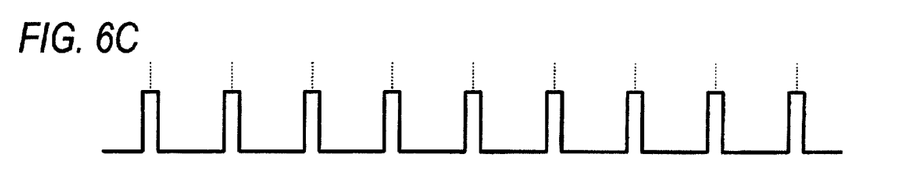
FIG. 6C illustrates a pulse signal with a pulse width that is decreased from the reference pulse signal with the centers of the pulses being aligned with each other.

As shown in FIGS. 6A, 6B, and 6C, it is preferable that the CPU 101, serving as a pulse adjusting unit, increases or decreases the pulse width of a pulse signal with reference to a center of each pulse of the pulse signal shown in FIG. 6A with the resonance frequency f0. When the pulse width is increased or decreased in this way, it is possible to increase or decrease a scanning width with laser light within a shorter period of time and appropriately correct large distortion.

Figure 7A:
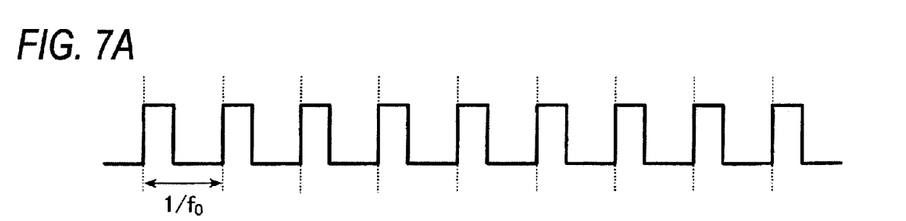
FIG. 7A illustrates a reference pulse signal.
Figure 7B:
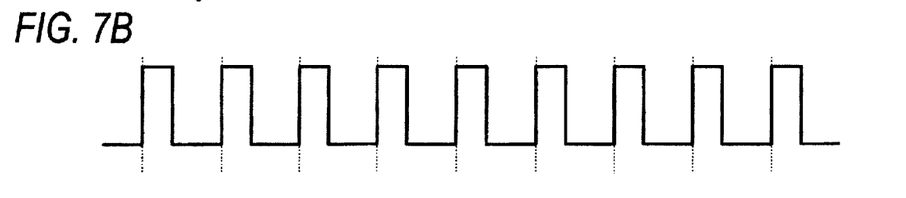
FIG. 7B illustrates a pulse signal with a pulse amplitude greater than that of the reference pulse signal.
Figure 7C:
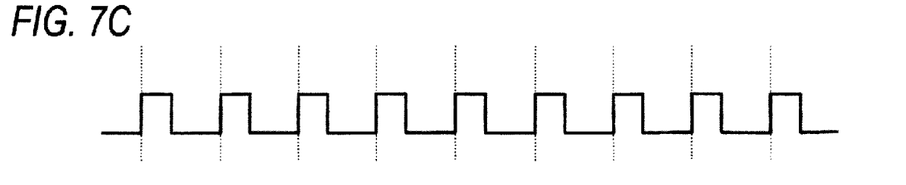
FIG. 7C illustrates a pulse signal with a pulse amplitude less than that of the reference pulse signal.

The CPU 101, serving as a pulse adjusting unit, controls the driving signal generating unit 6 to generate a pulse signal (see FIG. 7B) with a pulse amplitude that is greater than that of a pulse signal shown in FIG. 7A with the resonance frequency f0 or a pulse signal (see FIG. 7C) with a pulse amplitude that is less than that of the pulse signal shown in FIG. 7A. Then, the CPU 101 drives the electromagnetically-driven scanning mirror 4 with a pulse signal whose pulse amplitude is reduced as the scanning with the laser light is moved to the uppermost row or the lowermost row and the incident angle of the laser light on the screen S is reduced, according to the angle of the electromagnetically-driven scanning mirror 4 in the vertical direction, thereby reducing the angle range of the electromagnetically-driven scanning mirror 4 driven in the horizontal direction.

Next, the timing when the pulse pattern is changed to switch the pulse signals within one frame or the section in which the electromagnetically-driven scanning mirror 4 is driven by the pulse signal to scan the screen with the laser light when the laser projector 100 projects an image onto the screen S will be described with reference to FIGS. 8A to 8C.

Here, an example of the laser projector 100 arranged at the projection angle shown in FIG. 3B with respect to the screen S will be described.

Figure 8A:
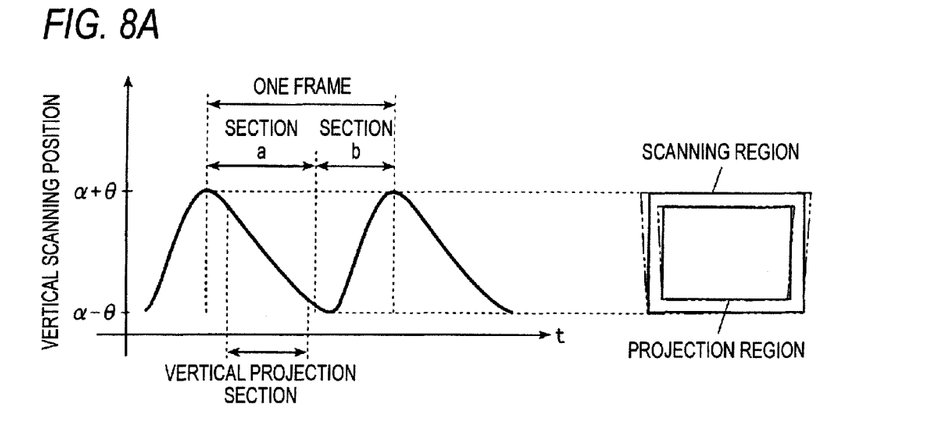
FIG. 8A illustrates a projection section and a non-projection section corresponding to the vertical scanning position of the electromagnetically-driven scanning mirror.

As shown in FIG. 8A, the section in which the electromagnetically-driven scanning mirror 4 of the laser projector 100 reflects the laser light to scan the screen (the time period in which the mirror 4 scans the screen for forming one frame of the image) includes a projection section (section a) in which the vertical scanning position of the electromagnetically-driven scanning mirror 4 is changed from the uppermost row, which is a start point, to the lowermost row, which is an end point, in the vertical direction while the electromagnetically-driven scanning mirror 4 performs the scanning with the laser light in the horizontal direction, thereby forming the one frame of the image on the screen S, and a non-projection section (section b) in which the vertical scanning position of the electromagnetically-driven scanning mirror 4 is returned from the lowermost row, which is the end point, to the uppermost row, which is the start point, in the vertical direction.

Figure 8B:
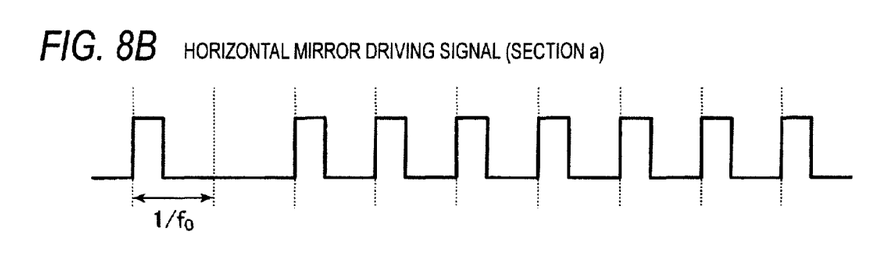
FIG. 8B illustrates an example of a horizontal mirror driving signal in the projection section.

In the projection section (section a), for example, a pulse pattern shown in FIG. 8B (a projection pulse pattern) with a relatively large number of pulses is set such that the angle of the electromagnetically-driven scanning mirror 4 driven in the horizontal direction is changed from a first angle range that is the minimum at the position '$\alpha+\theta$', which is the start point, to a second angle range that is the maximum at the position '$\alpha-\theta$', which is the end point.

Figure 8C:
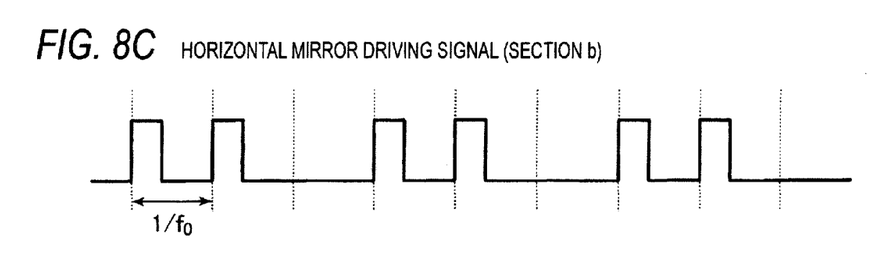
FIG. 8C illustrates an example of the horizontal mirror driving signal in the non-projection section.

In the non-projection section (section b), for example, a pulse pattern shown in FIG. 8C (a non-projection pulse pattern) with a relatively small number of pulses is set such that the angle range of the electromagnetically-driven scanning mirror 4 driven in the horizontal direction is changed from an angle range (second angle range) that is the maximum at the position '$\alpha-\theta$', which is the end point, to an angle range (first angle range) that is the minimum at the position '$\alpha+\theta$', which is the start point.

In the projection section (section a), the projection pulse pattern shown in FIG. 8B is set when the electromagnetically-driven scanning mirror 4 performs scanning with the laser light in the horizontal direction such that the vertical scanning position is changed from the position '$\alpha+\theta$', which is the start point, to the position '$\alpha-\theta$', which is the end point, and the angle range driven in the horizontal direction is gradually increased from the first angle range to the second angle range. Therefore, the image displayed on the screen S is corrected to have a rectangular shape.

In the non-projection section (section b), the non-projection pulse pattern shown in FIG. 8C is set when the vertical scanning position is changed from the position '$\alpha-\theta$', which is the end point, to the position '$\alpha+\theta$', which is the start point, and the angle range of the electromagnetically-driven scanning mirror 4 driven in the horizontal direction is gradually reduced. Therefore, the angle range returns to the first angle range corresponding to the start point of the projection section (section a), and the scanning can be appropriately performed in the next projection section (section a) for another frame.

As such, the pulse pattern of the pulse signal generated by the driving signal generating unit 6 is set so as to correspond to each section under the control of the CPU 101, serving as a pulse adjusting unit, that repeatedly performs a process of changing the pulse pattern from the projection pulse pattern (see FIG. 8B) to the non-projection pulse pattern (see FIG. 8C) at the timing when the projection section (section a) is changed to the non-projection section (section b) and a process of changing the pulse pattern from the non-projection pulse pattern (see FIG. 8C) to the projection pulse pattern (see FIG. 8B) at the timing when the non-projection section (section b) is changed to the projection section (section a). In this way, it is possible to reduce the angle range of the electromagnetically-driven scanning mirror 4 driven in the horizontal direction as the incident angle of laser light on the screen S is reduced. Therefore, it is possible to correct trapezoidal distortion and project a rectangular image onto the screen S.

In this way, it is possible to correct the image projected onto the screen S to have a rectangular shape by reducing the angle range of the electromagnetically-driven scanning mirror 4 driven in the horizontal direction as the incident angle of laser light on the screen S is reduced, according to the angle of the electromagnetically-driven scanning mirror 4 in the vertical direction.

When the angle range of the electromagnetically-driven scanning mirror 4 driven in the vertical direction is adjusted such that the interval of the trajectory of laser light reflected by the electromagnetically-driven scanning mirror 4 is constant, it is possible to project a rectangular image onto the screen S while maintaining a desired aspect ratio.

As described above, in the laser projector 100 according to the embodiment of the present invention, the angle range of the electromagnetically-driven scanning mirror 4 driven in the horizontal direction is reduced as the incident angle of laser light on the screen S is reduced, according to the elevation angle or the depression angle of the laser projector 100 (housing 100a) with respect to the screen S, which is detected by the inclination angle sensor 5. In this way, it is possible to correct the image projected onto the screen S to have a rectangular shape.

That is, the laser projector 100 includes the inclination angle sensor 5 and controls the driving signal generating unit 6 to generate a pulse signal for adjusting the angle range of the electromagnetically-driven scanning mirror 4 driven in the horizontal direction according to the detected angle (the elevation angle or the depression angle) of the laser projector 100 (housing 100a). Therefore, it is possible to easily adjust the angle range of the electromagnetically-driven scanning mirror 4 driven in the horizontal direction and easily correct a projection image.

In the above-described embodiment, the driving signal generating unit 6 generates a pulse signal corresponding to the angle (the elevation angle or the depression angle) of the laser projector 100 (housing 100a) detected by the inclination angle sensor 5, but the invention is not limited thereto. For example, the operating unit 1 may be manually operated to control the driving signal generating unit 6 to generate a pulse signal corresponding to the angle (the elevation angle or the depression angle) of the laser projector 100 (housing 100a).

It will be understood by those skilled in the art that the components may be appropriately changed.

What is claimed is:

1. A laser projector, comprising:
a laser light source configured to emit laser light;
a scanning section configured to scan a projection surface in a horizontal direction and a vertical direction with the laser light emitted from the laser light source, thereby forming an image on the projection surface;
a generating section configured to generate a pulse signal;
a driving section configured to reciprocate the scanning section in the horizontal direction in accordance with the pulse signal generated by the generating section; and
an adjusting section configured to adjust a pulse pattern of the pulse signal generated by the generating section so as to change a scanning angle range of the scanning section in the horizontal direction,
wherein a time period in which the scanning section scans the projection surface for forming one frame of the image includes:
a projection section in which a scanning position of the scanning section is changed from a start point to an end point in the vertical direction while scanning the projection surface in the horizontal direction with the laser light, thereby forming the one frame of the image; and
a non-projection section in which the scanning position of the scanning section is returned from the end point to the start point in the vertical direction,
wherein the adjusting section controls the generating section to generate the pulse signal having a projection pulse pattern for changing the scanning angle range of the scanning section from a first scanning angle range to a second scanning angle range in the projection section and a non-projection pulse pattern for changing the scanning angle range of the scanning section from the second scanning angle range to the first scanning angle range in the non-projection section.

2. The laser projector as set forth in claim 1, wherein the generating section increases or decreases a pulse width of the pulse signal to change the scanning angle range of the scanning section in the horizontal direction.

3. The laser projector as set forth in claim 2, wherein the generating section increases or decreases the pulse width of the pulse signal with respect to a center of each pulse in the pulse signal.

4. The laser projector as set forth in claim 1, further comprising a detecting section configured to detect an elevation angle or a depression angle of the laser projector with respect to the projection surface,
wherein the adjusting section adjusts the pulse pattern of the pulse signal generated by the generating section in accordance with the elevation angle or the depression angle detected by the detecting section.

5. The laser projector as set forth in claim 4, wherein the adjusting section controls the generating section to generate the pulse signal such that the scanning angle range of the scanning section in the horizontal direction is reduced as an incident angle of the laser light on the projection surface is reduced.

6. A laser projector, comprising:
a laser light source configured to emit laser light;
a scanning section configured to scan a projection surface in a horizontal direction and a vertical direction with the laser light emitted from the laser light source, thereby forming an image on the projection surface;
a generating section configured to generate a pulse signal;
a driving section configured to reciprocate the scanning section in the horizontal direction in accordance with the pulse signal generated by the generating section; and
an adjusting section configured to adjust a pulse pattern of the pulse signal generated by the generating section so as to change a scanning angle range of the scanning section in the horizontal direction,
wherein the generating section increases or decreases the number of pulses in the pulse signal to change the scanning angle range of the scanning section in the horizontal direction.

7. A laser projector, comprising:
a laser light source configured to emit laser light;
a scanning section configured to scan a projection surface in a horizontal direction and a vertical direction with the laser light emitted from the laser light source, thereby forming an image on the projection surface;
a generating section configured to generate a pulse signal;
a driving section configured to reciprocate the scanning section in the horizontal direction in accordance with the pulse signal generated by the generating section; and
an adjusting section configured to adjust a pulse pattern of the pulse signal generated by the generating section so as to change a scanning angle range of the scanning section in the horizontal direction,
wherein the generating section increases or decreases a pulse amplitude of the pulse signal to change the scanning angle range of the scanning section in the horizontal direction.

8. A laser projector, comprising:
a laser light source configured to emit laser light;
a scanning section configured to scan a projection surface in a horizontal direction and a vertical direction with the laser light emitted from the laser light source, thereby forming an image on the projection surface;
a generating section configured to generate a pulse signal;
a driving section configured to reciprocate the scanning section in the horizontal direction in accordance with the pulse signal generated by the generating section;
a detecting section configured to detect an elevation angle or a depression angle of the laser projector with respect to the projection surface; and
an adjusting section configured to adjust a pulse pattern of the pulse signal generated by the generating section in accordance with the elevation angle or the depression angle detected by the detecting section so as to change a scanning angle range of the scanning section in the horizontal direction,
wherein a time period in which the scanning section scans the projection surface for forming one frame of the image includes:
a projection section in which a scanning position of the scanning section is changed from a start point to an end point in the vertical direction while scanning the projection surface in the horizontal direction with the laser light, thereby forming the one frame of the image; and
a non-projection section in which the scanning position of the scanning section is returned from the end point to the start point in the vertical direction,
wherein the adjusting section controls the generating section to generate the pulse signal having a projection pulse pattern for changing the scanning angle range of the scanning section from a first scanning angle range to a second scanning angle range in the projection section and a non-projection pulse pattern for changing the scanning angle range of the scanning section from the second scanning angle range to the first scanning angle range in the non-projection section,
wherein the generating section increases or decreases at least one of the number of pulses in the pulse signal, a pulse width of the pulse signal, and a pulse amplitude of the pulse signal to change the scanning angle range of the scanning section in the horizontal direction, and
wherein the adjusting section controls the generating section to generate the pulse signal such that the scanning angle range of the scanning section in the horizontal direction is reduced as an incident angle of the laser light on the projection surface is reduced.

* * * * *